Jan. 4, 1927.  1,612,989
F. J. SCHWIMMER ET AL
OILING APPARATUS FOR BAND WHEEL MECHANISM
Filed Feb. 8 1923   2 Sheets-Sheet 2
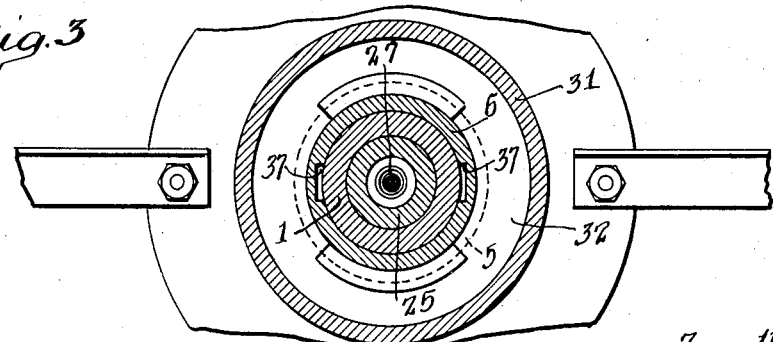
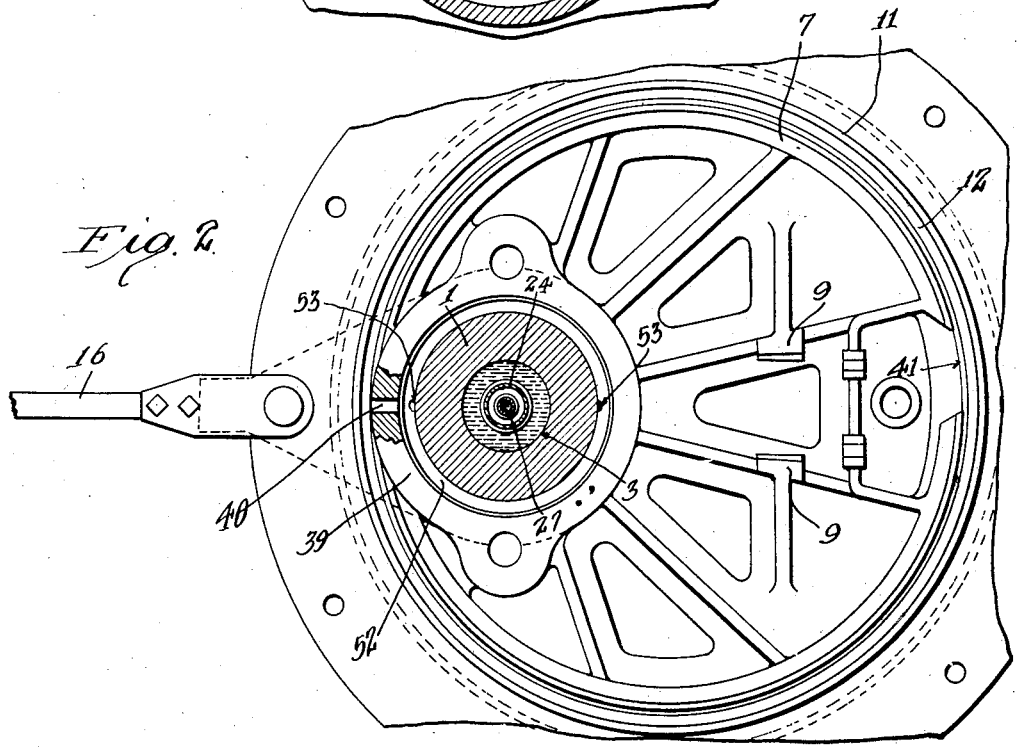
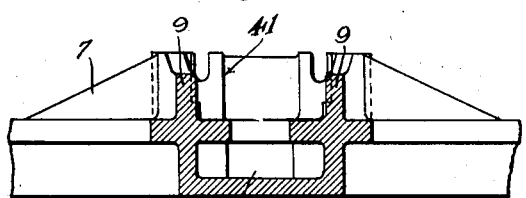
Inventors
Fred J. Schwimmer
Clyde S. Wright
By Lyon & Lyon attys Patented Jan. 4, 1927.

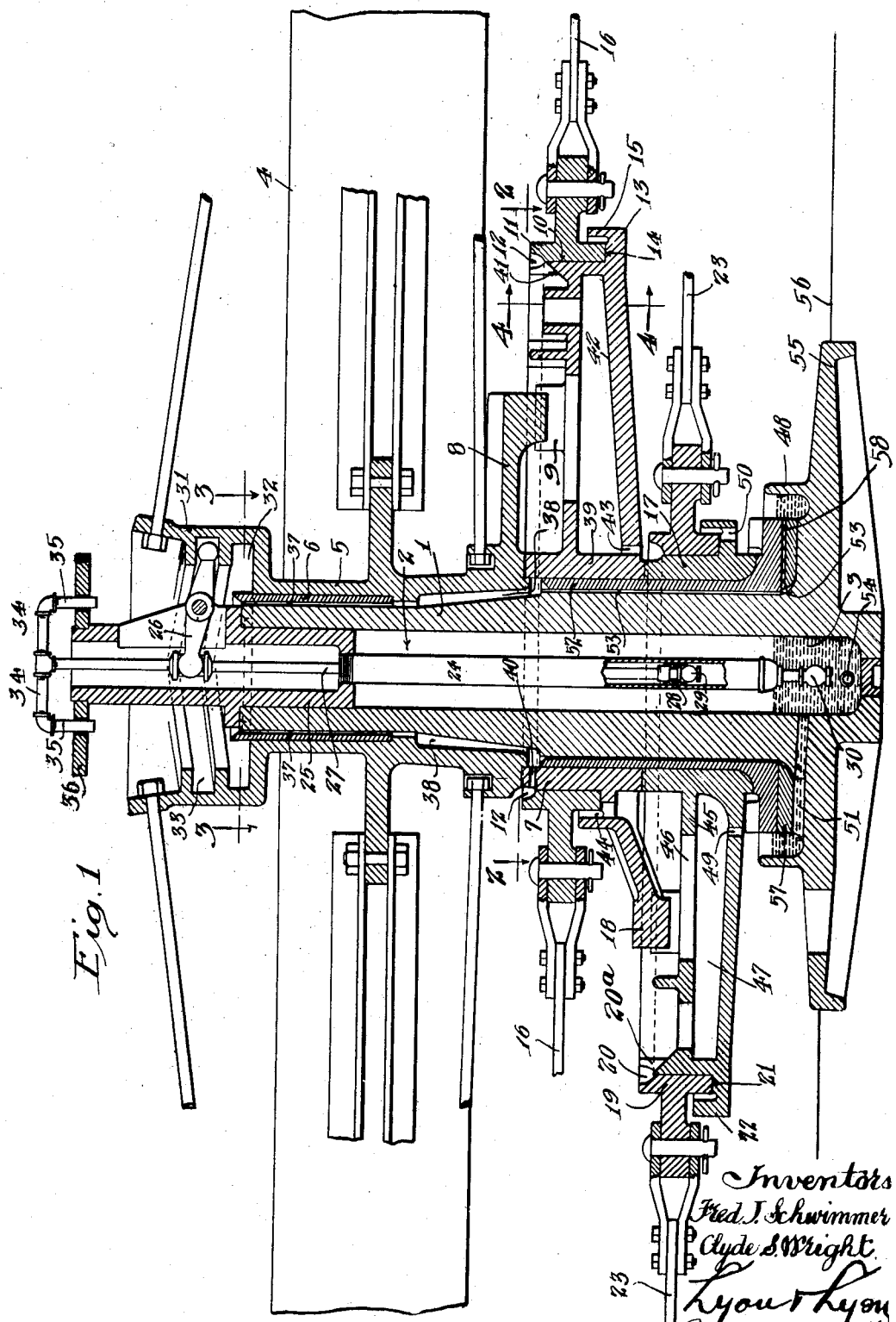

1,612,989

UNITED STATES PATENT OFFICE.

FRED J. SCHWIMMER AND CLYDE S. WRIGHT, OF TOLEDO, OHIO, ASSIGNORS TO THE NATIONAL SUPPLY COMPANY, OF TOLEDO, OHIO, A CORPORATION OF OHIO.

OILING APPARATUS FOR BAND-WHEEL MECHANISM.

Application filed February 8, 1923. Serial No. 617,697.

This invention relates to the lubrication of rotary apparatus and is described in the following specification as applied to a band wheel power apparatus such as used in oil well practice for the operation of pumps. The general object of the invention is to provide simple means for supplying a sufficient flow of lubricant to the bearing surfaces of a rotary mechanism. The band wheel power apparatus usually embodies in its construction one or more eccentrics, the straps of which carry pull rods which operate the pumps; and one of the objects of the invention is to provide a simple means for lubricating the bearing faces at the hub of the band wheel and also supplying the lubricant liberally to the bearing faces of the eccentrics, thereafter returning the oil to a reservoir from which it is automatically raised by the rotation of the band wheel.

Further objects of the invention will appear hereinafter.

The invention consists in the novel parts and combination of parts to be described hereinafter, all of which contributes to produce an efficient oiling apparatus for band wheel mechanism.

A preferred embodiment of the invention is described in the following specification while the broad scope of the invention is pointed out in the appended claims.

In the drawings—

Figure 1 is a vertical section through a band wheel power mechanism embodying our invention, certain parts being broken away.

Fig. 2 is a horizontal section through the mechanism of Figure 1 taken about on the line 2—2.

Fig. 3 is a horizontal section taken on the line 3—3 of Fig. 1.

Fig. 4 is a vertical section taken about on the line 4—4 of Figure 1 and illustrating the details of the oil guiding means.

The apparatus embodying our invention includes a substantially vertical or upright central spindle carrying a member in such a way that the spindle and the member are relatively rotatable. Associated with these members and preferably located in the spindle we provide a reservoir for a lubricant. In addition to this we provide automatic means for raising the lubricant from the reservoir and delivering the same to the wearing surfaces or bearing surfaces between the spindle and the other member. Where the apparatus includes other parts with wearing faces or surfaces we also provide means for guiding the lubricant to such faces and after lubricating all these bearing faces the lubricant is returned by guiding means which we provide which carries the lubricant back to the reservoir. In this way the bearing surfaces are all working substantially in a bath of lubricant or oil.

In applying our invention to an apparatus such as a band wheel power mechanism, the spindle 1 of the apparatus may be provided with a central bore or well 2, the bottom of which constitutes a reservoir 3 to receive a bath of lubricant or oil. On the upper portion of this spindle there is rotatably mounted a band wheel 4, the hub 5 of which is provided with a bushing 6 which comes in contact with the spindle. Below the band wheel we provide an eccentric 7 which may be driven from the hub of the band wheel by means of an arm 8 which engages between lugs 9 on the upper face of the eccentric. This eccentric is provided with a circumferential or cylindrical bearing face 10 which receives an eccentric strap 11 of suitable diameter to fit to it. The upper edges of these two parts, that is the eccentric and its strap, are cut away on their adjacent portions so that they cooperate to form a gutter or oil cup 12 extending along the edge of the strap and just above the location of the bearing faces.

The eccentric strap may be supported on the sheave or eccentric proper in any suitable way but we prefer to provide the eccentric with a projecting flange 13, the upper side of which forms a bearing face or seat 14 on which rests the lower face of the eccentric strap.

In order to retain the oil which lubricates the bearing faces of the strap and eccentric, we provide the outer edge of the flange 13 with an upwardly projecting lip 15 which extends continuously around the eccentric.

The eccentric strap is provided with pull rods 16 which may be connected to pumps or any other devices which are to be actuated by this mechanism.

A second eccentric 17 may be provided below the eccentric just described and this eccentric may be driven by means of an integral arm 18 extending down from the upper eccentric. The construction of this lower eccentric 17 is substantially the same as the upper eccentric. The upper edges of the eccentric 17 and of its strap 19 are constructed so as to form an annular oil cup or groove 20 similar to the oil cup 12. The eccentric strap 19 may be supported also on a bearing face 21 operating as a seat beyond which the eccentric is formed with an upwardly projecting lip 22 to retain the oil which gravitates down from the bearing faces.

This strap 19 is also provided with pull rods 23 for operating pumps.

We provide means for supplying a liberal quantity of oil from the reservoir 3 so that it passes all of these bearing faces described above including the bushing 6 and is finally returned to the reservoir 3. In order to accomplish this we provide within the spindle 1 a pump barrel 24, the upper end of which may be secured in a plug 25 seating on the upper end of the spindle. This plug extends above the spindle and is cut away on one side so as to carry a support means such as a lever 26 for operating the pump. This lever may connect directly with a tubular plunger rod 27, the lower end of which carries a plunger 28 and the upper check valve 29 of the pump. At the lower end of the barrel 24 a lower check valve 30 is provided.

In order to operate the pump plunger automatically we prefer to provide the upper end of the hub 5 of the band wheel with a crown 31, the interior of which is enlarged to form a basin 32 to carry oil and the inner face of this crown is provided with a cam 33 which engages the outer end of the lever 26 and rocks the lever as the band wheel rotates. The upper end of the tubular stem 27 carries two branch pipes 34 with vertically disposed nipples 35 which move through openings in the guide plate 36 and deliver the oil into the basin 32. The bore of the bushing 6 is provided with two or more longitudinal oil grooves 37 which enable the oil within the basin 32 to descend between the bushing and the bearing face of the spindle, thereby lubricating these faces. Between the lower portion of the hub 5 and the spindle 1 an annular guide chamber 38 is provided for the oil which carries the oil down to a point substantially level with the upper oil groove 12, and the upper edge of the hub 39 of the upper eccentric is provided with a port or passage 40 which admits the oil from this chamber 38 into the groove 12. (See Figs. 1 and 2.) This port passes through the hub of the eccentric where the outline of the hub is substantially tangent to the outer bearing face 10 of the eccentric. In this way oil is supplied to the groove 12 and flows around in the groove so as to become distributed throughout substantially the entire circumference of the bearing surface 10. The upper edge of the eccentric 7 is provided with means such as a gap 41 (see Fig. 1) which permits excess oil to pass from the groove or annular cup 12 down into an inclined oil duct 42, (see Fig. 4), which extends radially inwardly from the edge of the eccentric to its hub 39. The inner end of this oil duct 42 is provided with a passage 43 which is directly over the inner end or inner portion of the corresponding annular groove or annular oil cup 20 of the lower eccentric. In this way the oil is delivered from the upper cup 12 down into the lower cup 20.

The excess oil which is caught by the lip 15 on the eccentric descends onto the lower eccentric 17 by reason of a small drip opening 44 which is formed adjacent to the bearing face 14 at a point near the inner end of the arm 18. The lower eccentric 17 is provided with a horizontal web 45 with a large opening 46 through which the oil can pass down into an inclined radial oil duct 47 similar to the oil duct 42 of the upper eccentric.

At the base of the spindle we provide a base cup 48 for catching all the oil which descends by gravity through this mechanism and the oil carried by the duct 47 passes into this cup through a small drip opening 49.

In order to catch the oil which is retained by the lip 22 we provide a small drip opening 50 which is similar to the drip opening 44 of the upper eccentric, that is to say, this drip opening is located near the hub of the eccentric and in a position to enable the oil to flow down into the cup 48 (see Fig. 1). The bottom of the cup 48 communicates by a radial port 51 with the reservoir 3 operating as means to return the oil to the reservoir.

The eccentrics may be mounted, if desired, on a common bushing 52, the bore of which may be provided with longitudinal grooves 53 to facilitate the down flow of oil. The upper end of this bushing terminates at the lower end of the annular oil chamber 38 described above.

The reservoir 3 may be provided with an opening 54 in its side through which oil may be supplied to the reservoir when desired.

The base 55 of the spindle may be supported in a concrete foundation, the upper face of which would lie substantially at the level of the line 56.

The lower end of the bushing 52 may rest on a friction plate or step bearing ring 57. The bearing faces of this ring and the bushing are liberally supplied with oil by the grooves 53. If desired, radial oil grooves such as the groove 58 (Fig. 1) may be provided between the bushing and the plate 57 which deliver the oil to the cup 48.

In the operation of the mechanism, as the band wheel rotates the cam wheel 33 operates to rock the pump lever 26 and this reciprocates the tubular pump stem or plunger rod 27 thereby raising oil from the reservoir 3 and delivering it into the basin 32 within the crown 31. From the basin the oil descends by gravity in the oil grooves 37 and lubricates the hub of the band wheel. From this point the oil passes down into the oil chamber 38 and thence out through the radial opening 40 into the cup 12. The overflow oil from the cup 12 descends through the gap 41 into the radial oil duct 42 and flows radially inward finally descending through the port 43 into the oil groove 20 of the lower eccentric. From the lower eccentric the oil passes downwardly through the gap 20$^a$ in its edge so as to be received in the oil duct 47, thence passing through the drip opening 49 down into the cup 48 from which it flows inwardly in the port 51 to the reservoir 3.

The oil which finds its way down over the bearing face 10 of the upper eccentric lubricates the bearing face 14 and passes down through the opening 44 which delivers the oil into the oil duct 47.

The oil which is retained by the lip 22 of the lower eccentric passes down through the drip opening 50 and thence into the cup 48.

The oil which passes down the inner face of the bushing 52 arrives at the lower face of the bushing and thence may work its way out to the cup 48.

It will be noted that the oil chamber 38 is located directly over the common bushing 52 of the eccentrics so that this bushing is liberally supplied with oil at all times.

It is understood that the embodiment of the invention described herein is only one of the many embodiments this invention may take and we do not wish to be limited in the practice of our invention nor in our claims to the particular embodiment set forth.

What we claim is:

1. In apparatus of the kind described, the combination of an upright central spindle, a power driven wheel having a hub rotatably mounted on the spindle, a pump carried within the spindle, a cam carried by the rotatable member, means actuated thereby for operating the pump to raise the lubricant within the spindle, an eccentric driven by the power driven wheel, a strap therefor, means for guiding the lubricant raised by the pump to the bearing surfaces between the spindle and power driven wheel and between the bearing surfaces of the eccentric and strap, and means for guiding the lubricant thereafter back to the pump.

2. In apparatus of the kind described, the combination of an upright spindle having a central bore the bottom whereof constitutes an oil reservoir, a power driven wheel rotatably mounted on said spindle having a crown with a basin formed on the interior thereof, a pump lever supported at the upper end of the spindle, said crown having a cam for actuating the pump lever, a pump within the bore of said spindle operated by the lever for raising oil from the reservoir to the basin, means for guiding the oil from the basin to the bearing surfaces between the power driven wheel and the spindle, and means for guiding the oil thereafter back to the reservoir.

3. In apparatus of the kind described, the combination of an upright spindle with an oil reservoir therein, a pump carried by the spindle, a power driven wheel rotatably mounted on the spindle having a cam, means actuated by the cam for operating the pump when the power driven wheel rotates, an eccentric driven by the power driven wheel, a strap carried by the eccentric and having means for attaching pull rods thereto, means for guiding the oil raised by the pump to the bearing surfaces between the power driven wheel and the spindle and for guiding the oil thereafter to the bearing surfaces of the eccentric and strap, and means for guiding the oil thereafter back to the reservoir.

4. In apparatus of the kind described, the combination of an upright spindle with an oil reservoir, a power driven wheel rotatably mounted on the spindle, a pump, means for automatically actuating the same by the rotation of the power driven wheel to raise oil from the reservoir, an eccentric driven by the power driven wheel, a strap carried thereby and carrying pull rods, a second eccentric below the first eccentric and driven therewith, a strap with pull rods corresponding to the second eccentric, means for guiding the oil raised by the pump to the bearing surfaces between the power driven wheel and the spindle and to the bearing surfaces of the first eccentric and its strap, means for guiding the oil also to the bearing surfaces between the second eccentric and its strap, and means for guiding the oil back to the reservoir.

5. In an apparatus of the kind described, a substantially vertical spindle, power driven and eccentric members rotatable thereon, a strap bearing on the periphery of the eccentric member, a reservoir for lubricant, a pump adapted to raise lubricant from the reservoir, means delivering lubricant so raised to the bearing between the strap and the eccentric member, and means operated by one of the members for actuating the pump, there being provision for returning excess lubricant from the bearing to the reservoir.

6. In an apparatus of the kind described, a substantially vertical spindle, a power driven member and a plurality of eccentric members rotatable about the same, a strap bearing on the periphery of each eccentric member, a reservoir for lubricant, a pump adapted to raise lubricant from the reservoir, means delivering lubricant so raised to the bearings between each strap and its eccentric member, and means operated by one of the members for actuating the pump, there being provision for returning any excess lubricant from the bearings to the reservoir.

7. In an apparatus of the kind described, a substantially vertical spindle, a power driven member and a plurality of eccentric members rotatable about the same, a strap bearing on the periphery of each eccentric member, a reservoir for lubricant, a pump adapted to raise lubricant from the reservoir, means delivering lubricant so raised to the bearings between each strap and its eccentric member, and means operated by one of the members for actuating the pump, there being provision for returning any excess lubricant from the bearings to the reservoir and the said delivering means including provision whereby any excess lubricant delivered to one of the bearings is delivered to the other bearing.

8. In apparatus of the kind described, the combination of an upright spindle having an oil reservoir therein, a power driven wheel rotatably mounted on the upper portion of said spindle, an eccentric driven from the power driven wheel and rotatably mounted on the spindle, a second eccentric below the first eccentric driven by the first eccentric and rotatably mounted on the spindle, a strap corresponding to each eccentric, said spindle having an annular oil cup at the base thereof, a pump associated with the spindle, automatic means for actuating the pump to raise oil from the reservoir as the power driven wheel rotates, means for guiding the oil raised by the pump to the bearing faces of the power driven wheel and spindle and thereafter to the bearing faces of the first named eccentric and its strap, means for guiding the oil thereafter to the bearing faces of the second eccentric and its strap, and means for guiding the oil thereafter to the said cup at the base of the spindle and thence back into the said reservoir.

9. In an apparatus of the kind described, a substantially vertical spindle, a power driven member rotatably mounted thereon, an eccentric member driven by the power driven member and rotatably mounted on the spindle, a strap bearing on the periphery of the eccentric member, a reservoir for oil, and automatic means for raising oil from the reservoir and delivering it to the bearing surfaces between the spindle and the members, there being a passage for delivering excess oil from the bearing between the power driven member and the spindle to the bearing surfaces between the eccentric member and the strap.

10. In a pumping power, a substantially vertical spindle-member, a power driven member rotatable thereon, an eccentric member rotatable with the power driven member, a ring member bearing on the periphery of the eccentric, a reservoir for lubricant, a pump adapted to raise lubricant from the reservoir, a cam operated by one of the rotatable members, a lever operated by the cam and operatively connected to the pump, and connections from the pump guiding the lubricant to the bearings for the said members.

11. The combination with a pumping power having a shaft, a power driven wheel and a plurality of eccentrics rotatable with said power driven wheel about said shaft, of a lubricating system including a pump, means connected to the pump for conveying the lubricant to the upper portion of said device and means for distributing said lubricant by gravity to the working parts of said device.

12. The combination with a pumping power having a shaft, a power driven wheel and a plurality of eccentrics rotatable with said power driven wheel about said shaft, of a lubricating system including a pump, means connected to the pump for conveying the lubricant to the upper portion of said device, means for distributing said lubricant by gravity to the working parts of said device and collecting the lubricant adjacent the pump.

13. The combination with a pumping power having a shaft, a power driven wheel and a plurality of eccentrics mounted for rotation with said power driven wheel about said shaft, of a lubricating system including a lubricant reservoir, a pump associated therewith, means connected to said pump for conveying the oil to a point adjacent the upper end of said pumping power, said power driven wheel and eccentrics being formed with a plurality of oil conducting passages extending to the bearing surfaces of the movable parts whereby the oil may be conducted thereto by gravity and means for collecting the oil and conveying it to said reservoir.

14. The combination with a pumping power having a shaft, a power driven wheel and a plurality of eccentrics mounted for rotation with said power driven wheel about said shaft, of a lubricating system including a lubricant reservoir, a pump associated therewith, means connected to said pump for conveying the oil to a point adjacent the upper end of said pumping power, said power driven wheel and eccentrics being formed with a plurality of oil conducting passages extending to the bearing surfaces of the movable parts whereby the oil may be conducted thereto by gravity, means for collecting the oil and conveying it to said reservoir, an oil collecting groove formed in the base of said power driven wheel power for collecting the used lubricant and means connecting said groove to said reservoir.

15. In a pumping power of the class described, a shaft, a power wheel member mounted for rotation thereon, an eccentric member connected to said power wheel member for rotation therewith about said shaft, a lubricant reservoir, a pump associated therewith, means connected to said pump for conveying the oil to a point adjacent the upper end of said shaft where it is distributed by gravity to the working parts of the power wheel member and eccentric member and a cam associated with one of said members for operating said pump.

16. In an apparatus of the class described, a vertical spindle member, a superimposed horizontal power wheel member and two eccentric members rotatable on the spindle member, one of each two adjacent members having an arm positioned between two lugs on the other of said two adjacent members, whereby the rotation of one member causes the rotation of the other members.

17. In an apparatus of the class described, a vertical spindle member, a superimposed horizontal power wheel member and two eccentric members rotatable on the spindle member, one of each two adjacent members having an arm interlocked with the other of said two adjacent members, whereby the rotation of one member causes the rotation of the other members.

18. In an apparatus of the kind described, a substantially vertical spindle member, horizontal power driven and eccentric members mounted to rotate thereon, there being a reservoir for lubricant, a plunger pump adapted to raise lubricant from the reservoir, means delivering the lubricant from the pump to the bearing surfaces between the said members, and means operated by one of the rotatable members for actuating the plunger.

19. In an apparatus of the class described, an upright spindle, a power driven member rotatably mounted thereon, an eccentric member driven by the power driven member and rotatably mounted on the spindle, a second eccentric member rotatably mounted on the spindle below the first eccentric member and driven by the latter, a strap on the periphery of each eccentric member, a flange projecting beyond the periphery of each eccentric member and beneath each strap, an upright lip at the outer edge of each flange and beyond each strap and opposite thereto, the flanges and lips forming annular oiling grooves in which the straps are seated, an oil reservoir, a pump for delivering oil therefrom to the surfaces between the upper cam and strap, there being provision for delivering excess oil in the upper oiling groove to the bearing surfaces between the lower cam and strap, and there being provision for delivering any excess oil in the lower oiling groove to the reservoir, and means actuated by one of the members for operating the pump.

Signed at Toledo, Ohio, this 20th day of January, 1923.

FRED J. SCHWIMMER.
CLYDE S. WRIGHT.